UNITED STATES PATENT OFFICE.

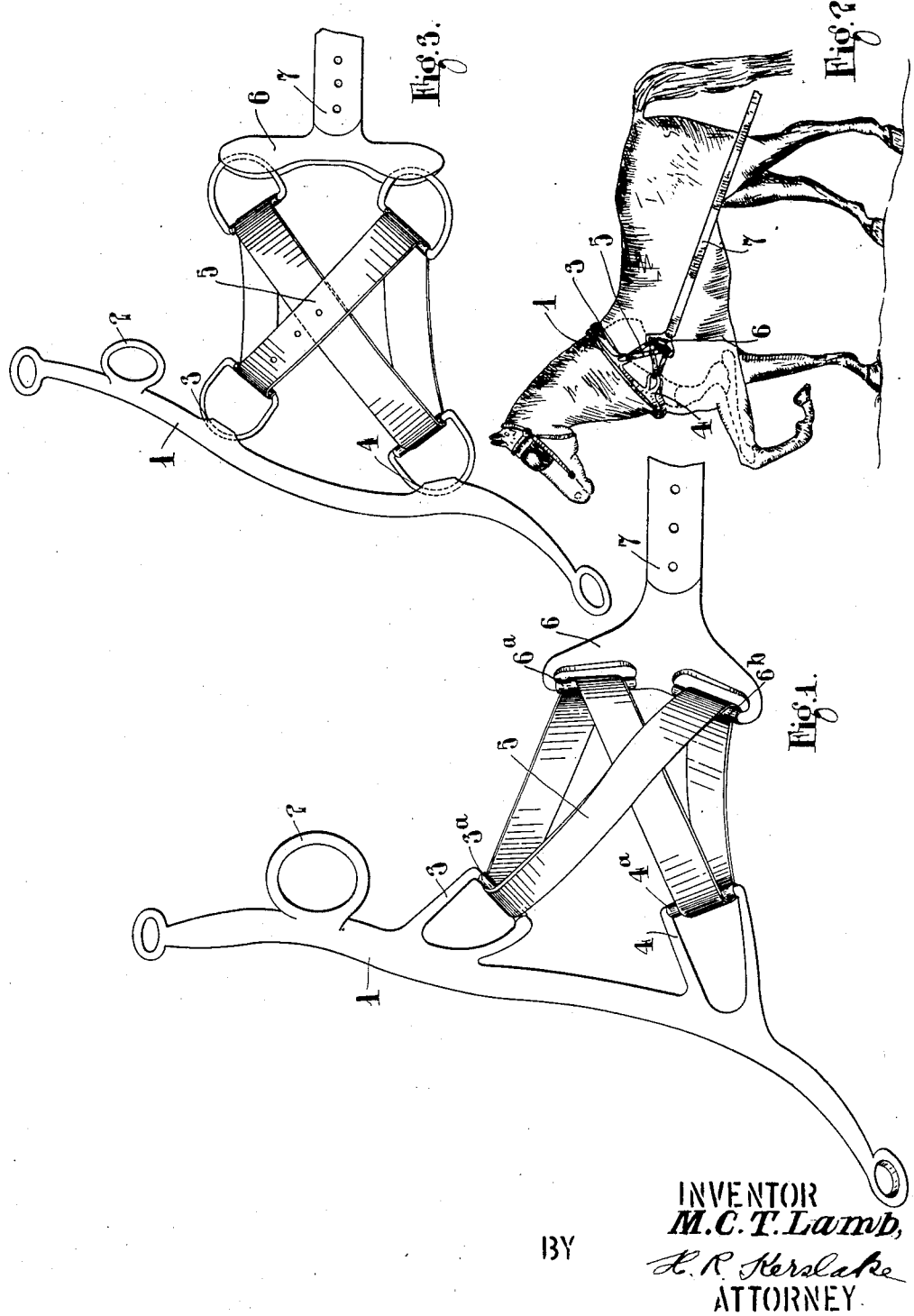

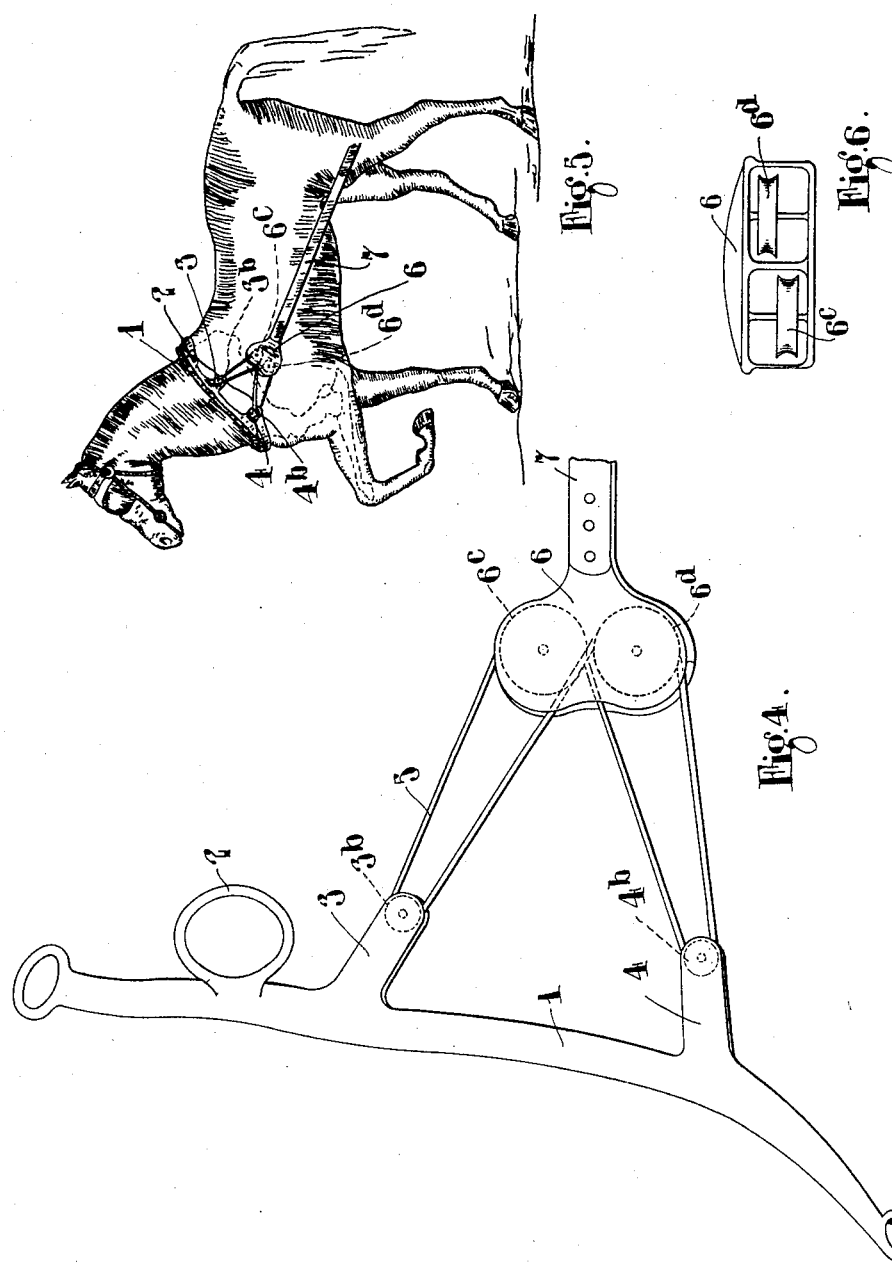

MARGARET CAROLINE THURLOW LAMB, OF BOWDON, ENGLAND.

HARNESS.

1,389,882.    Specification of Letters Patent.    Patented Sept. 6, 1921.

Application filed July 24, 1919. Serial No. 313,128.

*To all whom it may concern:*

Be it known that I, MARGARET CAROLINE THURLOW LAMB, a subject of the King of Great Britain and Ireland, and residing at Vale House, Langham Road, Bowdon, in the county of Chester, England, have invented certain new and useful Improvements in Harness, of which the following is a specification.

This invention relates to harness for draft horses and like animals.

With the common method of connecting the traces with the hames of the collar, in ordinary draft there is between the greater part of the collar and the shoulder blade an angle of about 25° which results in wasted power and makes it easier for the horse to stumble when going uphill.

The connection of each trace to two points of draft on each of the hames or on each side of the collar by two flexible or rigid connecting members of fixed length as has previously been proposed, will not in itself have the effect of distributing the pressure due to the pull on the traces uniformly over the fore edges of the blade bones of the horse when in draft.

The object of the invention is to provide a harness comprising a draft connection between the traces and the hames whereby the pressure due to the pull on the traces will be distributed uniformly over the fore edges of the blade bones of the horse when in draft.

The connection with the hames may be effected by means of loops, the upper loops being arranged at a more acute angle with the hames than the lower loops, so as to give a more direct pull upon the lower part of the shoulder blades which have a wider bearing surface. The loops are conveniently connected together and to a butterfly link by means of an endless strap.

The butterfly link may have two eyes, provided with runners so that the strap may pass through one loop secured at the upper point of draft through the lower eye of the butterfly link to the loop secured at the lower point of draft back to the upper eye in the butterfly link and then to the upper point of draft, the two ends of the strap being secured together.

Means may be provided to prevent relative motion between the two adjacent portions of the strap at the points where they engage the loops secured at the points of draft.

The butterfly links are also provided with means whereby they are secured to the traces, and such means with advantage may comprise an eye in each link to which the traces are secured by a clip loosely arranged therein.

Instead of a butterfly link and the loops on the hames, any equivalent device may be secured to the trace and to the hames for the purpose of obtaining the desired distribution of pressure.

The invention is illustrated by way of example in the accompanying drawings, in which:—

Figure 1 is an illustration of one construction;

Fig. 2 illustrates the position occupied by the several parts of the harness when the device shown in Fig. 1 is in use;

Fig. 3 is an illustration of a somewhat modified construction;

Figs. 4 and 5 are respectively a view of yet another construction of hame in accordance with the invention and an illustration of the hame in use, and Fig. 6 is a view of a detail of the construction illustrated by Figs. 4 and 5, while

Figure 7:
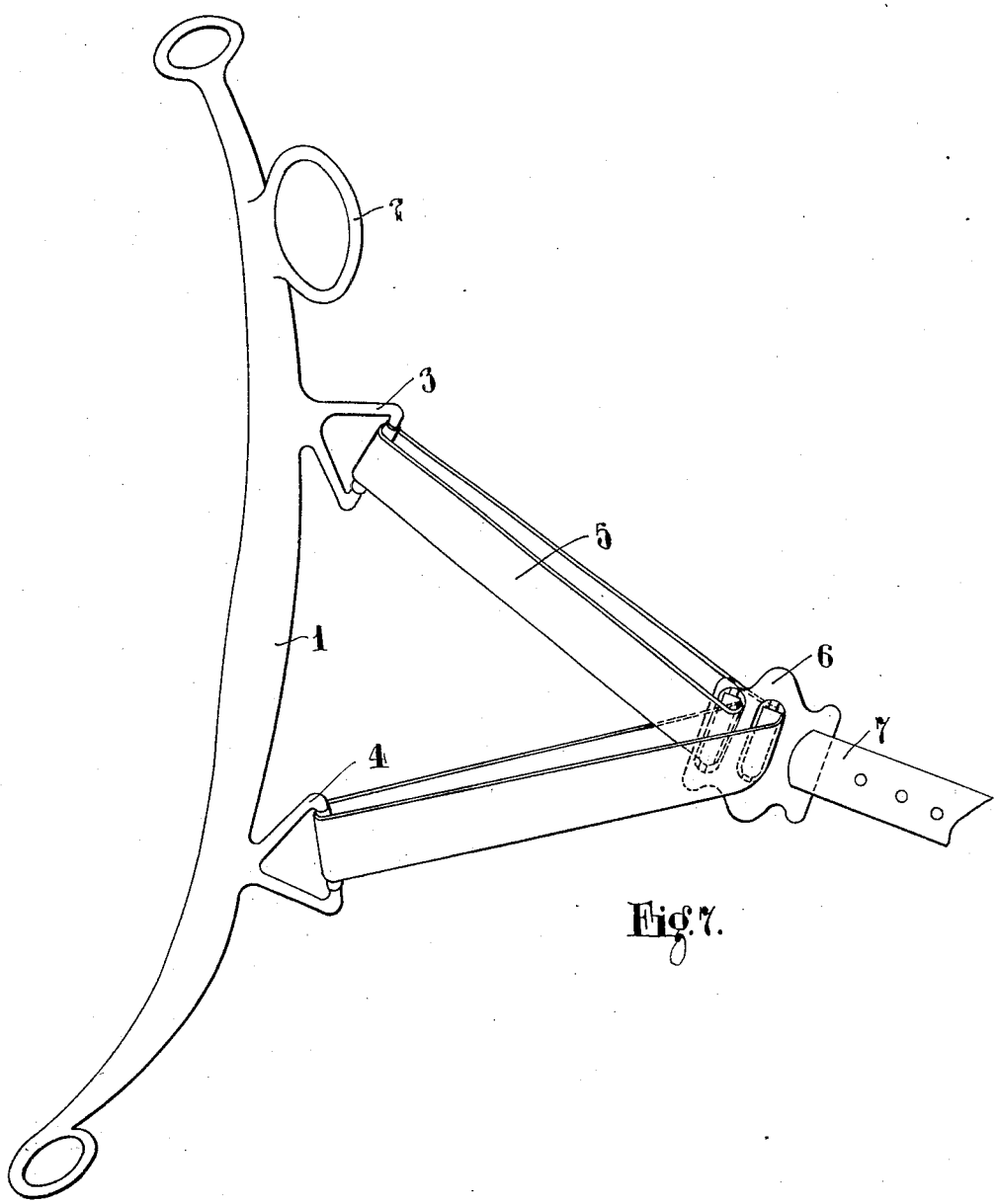
Fig. 7 illustrates a fourth mode of construction.

In the drawings, 1 is the hame, 2 the rein ring, 3 and 4 the points of draft on the hame, 5 the means securing the hame to the member 6 which in turn is connected to the trace 7.

In the constructions illustrated by Figs. 1 and 2 and 7, the points of draft are constituted by loops provided with runners $3^a$ and $4^a$ over which the means—in these constructions a strap—securing the hame to the members 6 are passed. The members 6 are also provided with runners $6^a$ and $6^b$, the purpose of the runners being to give that freedom of motion between the several elements of the connection between the trace and hame which will enable the pressure due to the pull on the traces to be distributed over the fore edges of the blade bones of the horse.

In the construction illustrated by Fig. 3, D-shaped loops are connected to the hames and are provided on the members 6 and these loops are similarly provided with runners.

In the construction illustrated by Figs. 4, 5 and 6, pulleys 3ᵇ and 4ᵇ are provided in connection with the points of draft on the hame and pulleys 6ᶜ and 6ᵈ are provided on the member 6. In this case a round strap or a wire rope covered with suitable material is employed instead of the flat straps used in connection with the devices illustrated in the other figures.

With a collar according to the invention, the horse can throw himself into the collar without any severe shock to the shoulders, and in doing so he will use all his weight to the best advantage and with much less chance of stumbling. As the pressure in draft is equalized over the whole length of the shoulder, the possibility of the sore shoulders is reduced particularly as the violent hitting of the shoulder against the lower edge of the collar, as will occur with ordinary harness, is prevented.

In the appended claims it is to be understood that the expression "eyes provided with runners" includes pulleys connected to the hames or the member 6 or other devices performing a simliar function.

Having now described my invention, what I claim as new and desire to secure by Letters Patent is:—

1. A harness comprising a hame provided with a pair of spaced eyes having runners therein, the lowermost of said eyes being positioned at a point located at a substantial distance below the usual point of draft, a trace provided on its ends with a member, said member being provided with a pair of eyes having runners therein, and an endless band extending from one of said eyes on the hame to one of said eyes on the member of the trace; back to the other of said eyes on said hame; then through the other eye of said member and finally back to the first mentioned eye of said hame.

2. A harness as set forth in claim 1, in which the eyes on the hame are loops, and the upper of said loops is arranged at a more acute angle than the lower, so that a more direct pull can be obtained on the lower part of the shoulder blades which present a wide bearing surface.

In testimony whereof I have signed my name to this specification.

MARGARET CAROLINE THURLOW LAMB.